Oct. 12, 1937. H. W. SANFORD 2,095,348
DROP BOTTOM MINE CAR
Original Filed Dec. 17, 1932 8 Sheets-Sheet 1
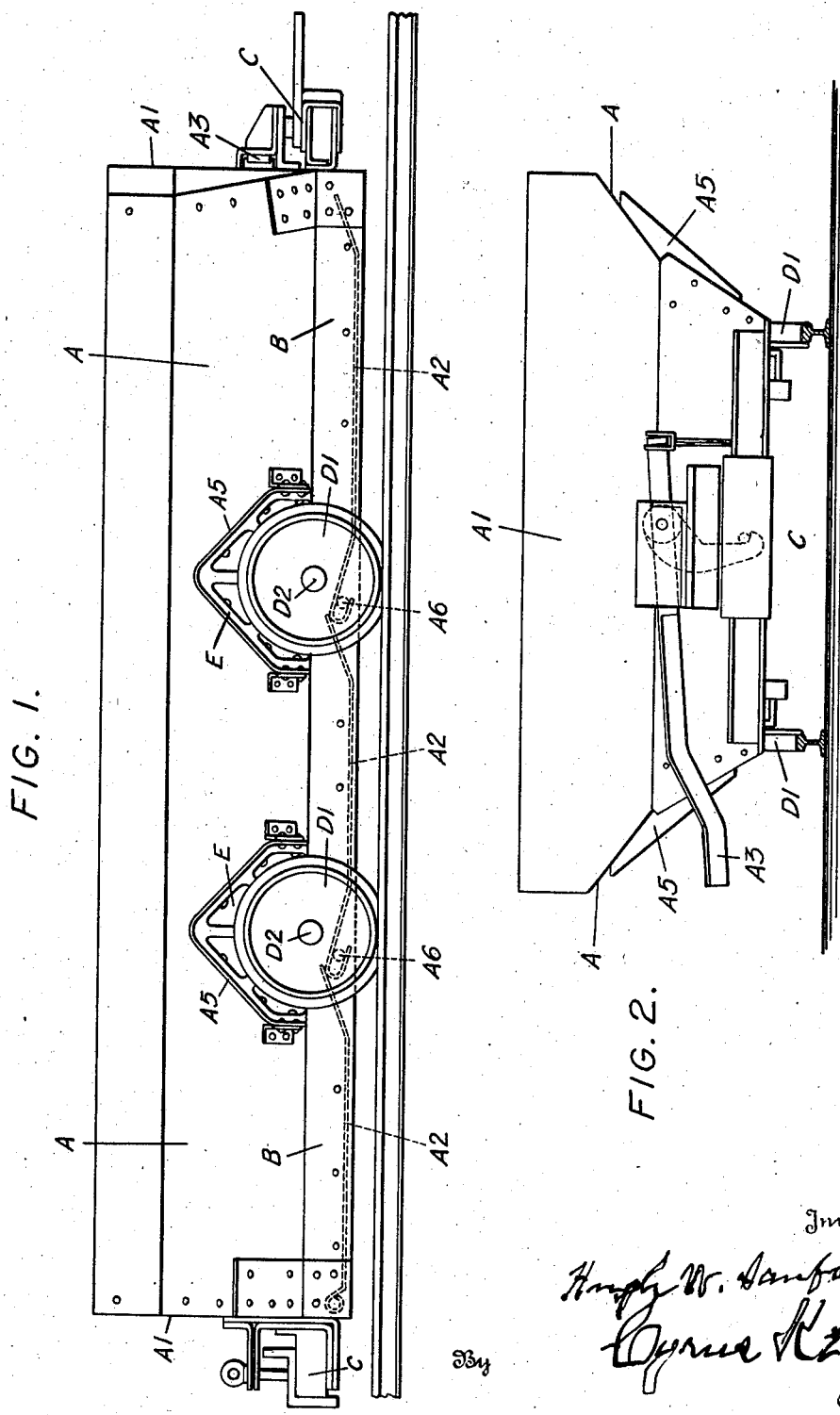

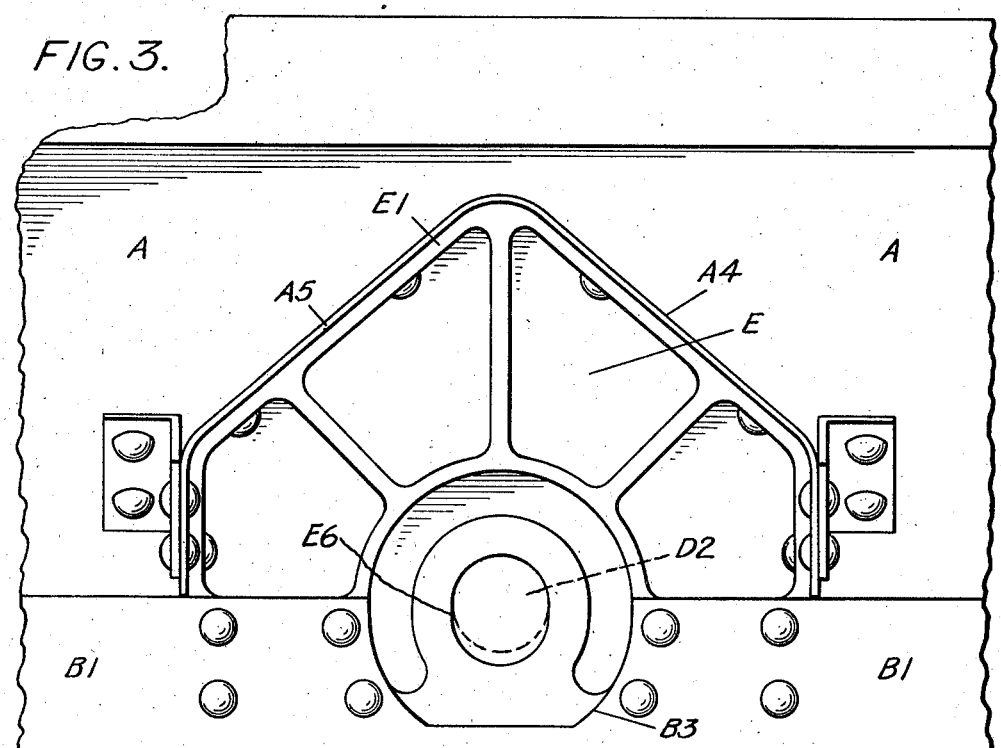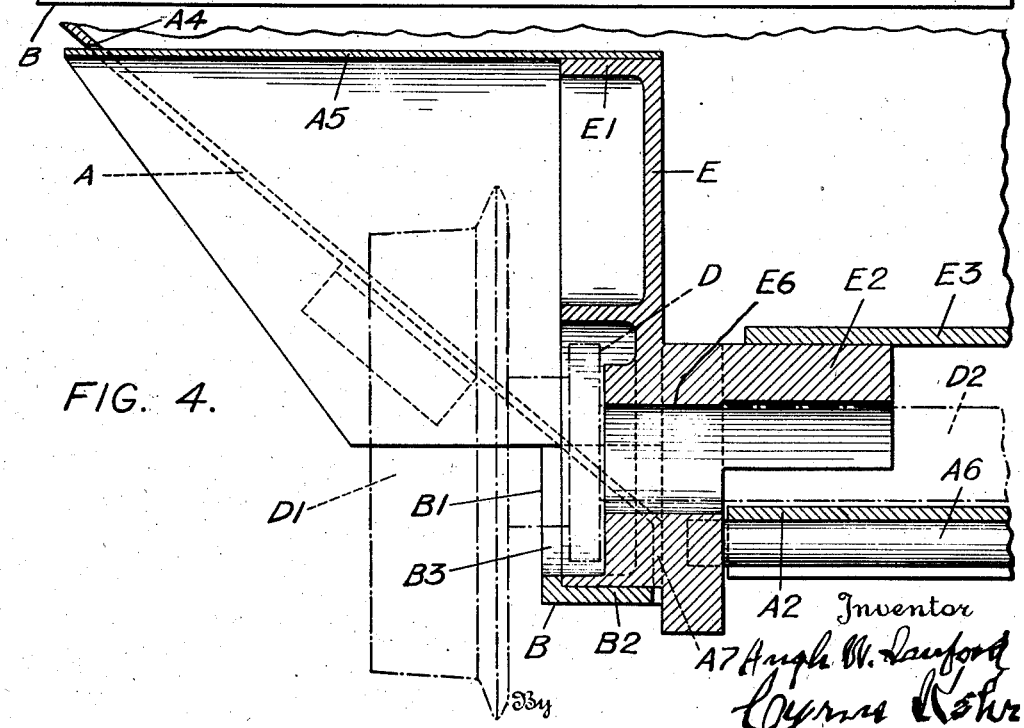

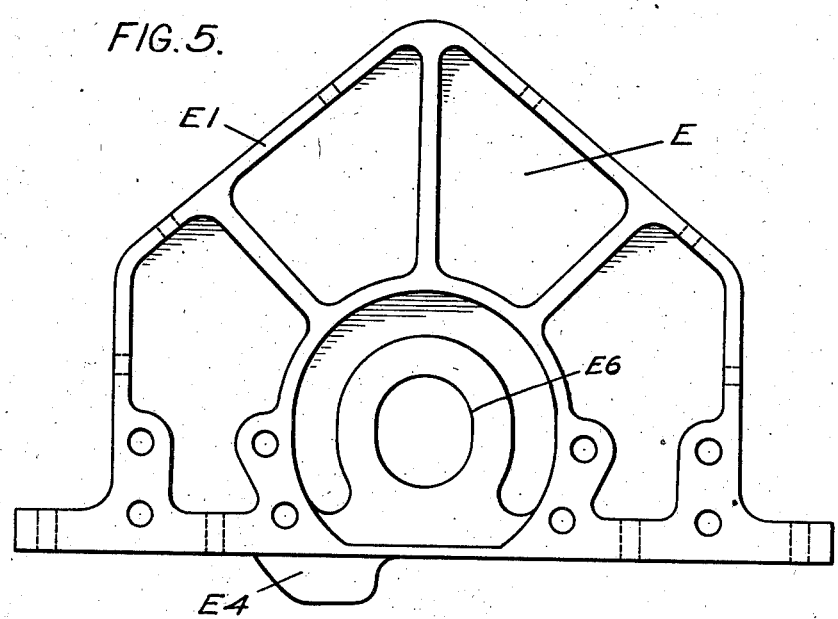
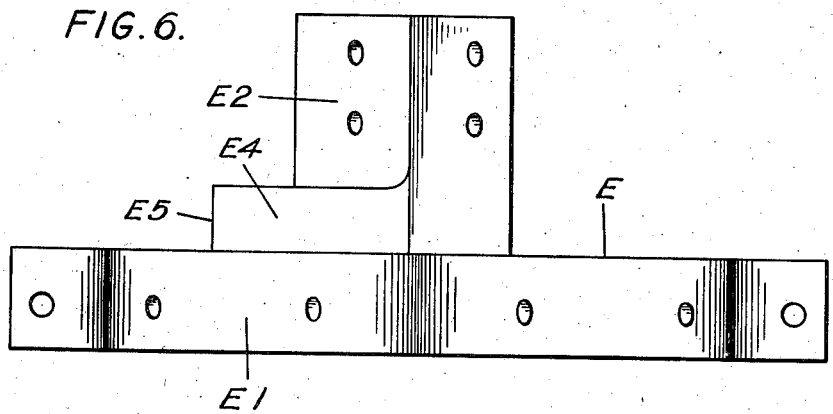

Oct. 12, 1937.  H. W. SANFORD  2,095,348
DROP BOTTOM MINE CAR
Original Filed Dec. 17, 1932  8 Sheets-Sheet 4
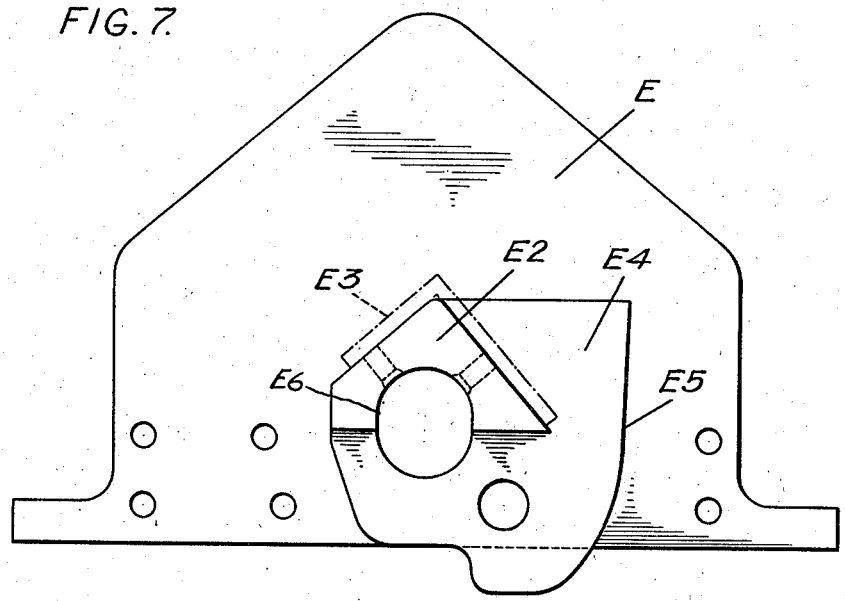
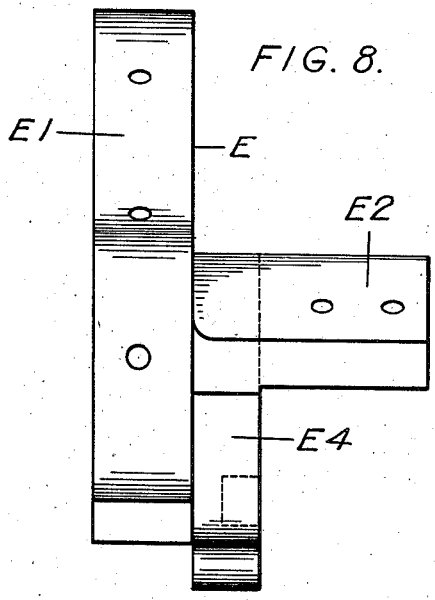 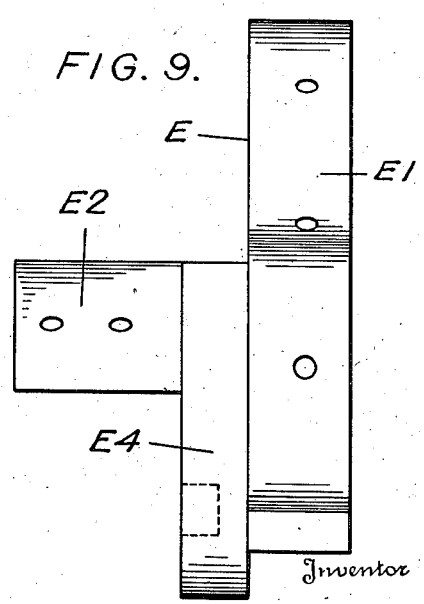
Inventor
Hugh W. Sanford
Cyrus R? Ur
By  Attorney

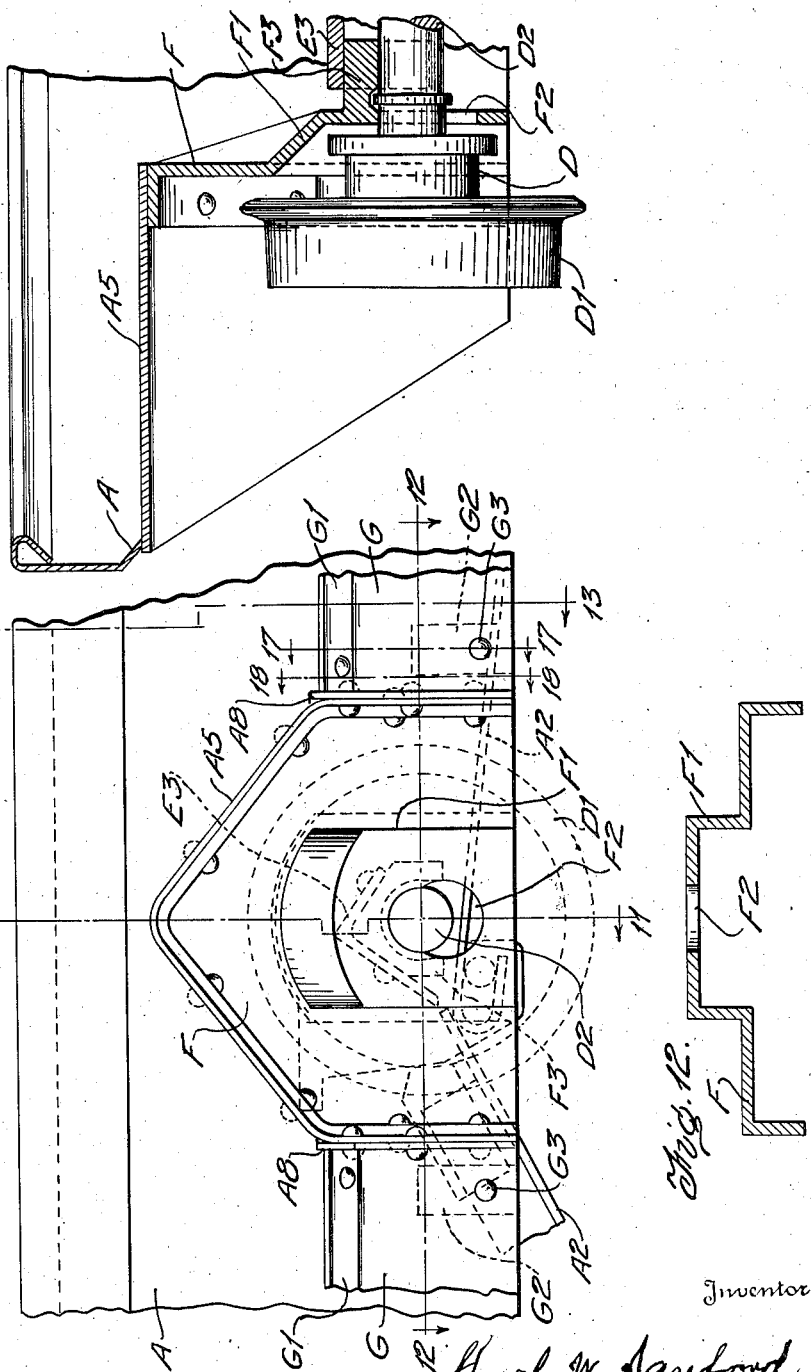

Oct. 12, 1937.  H. W. SANFORD  2,095,348
DROP BOTTOM MINE CAR
Original Filed Dec. 17, 1932   8 Sheets-Sheet 6
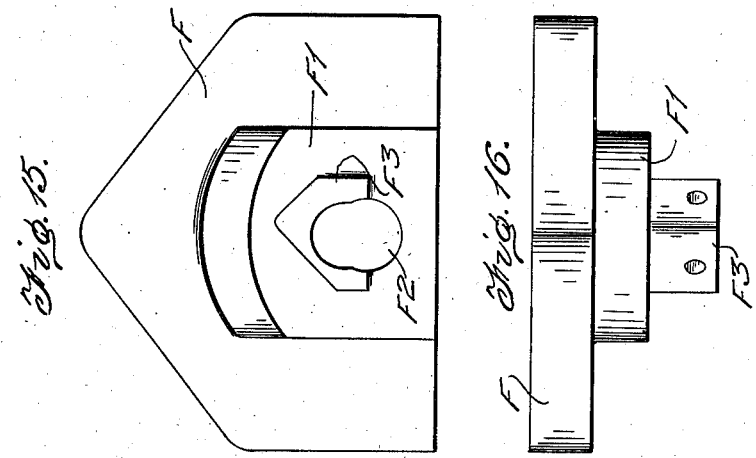
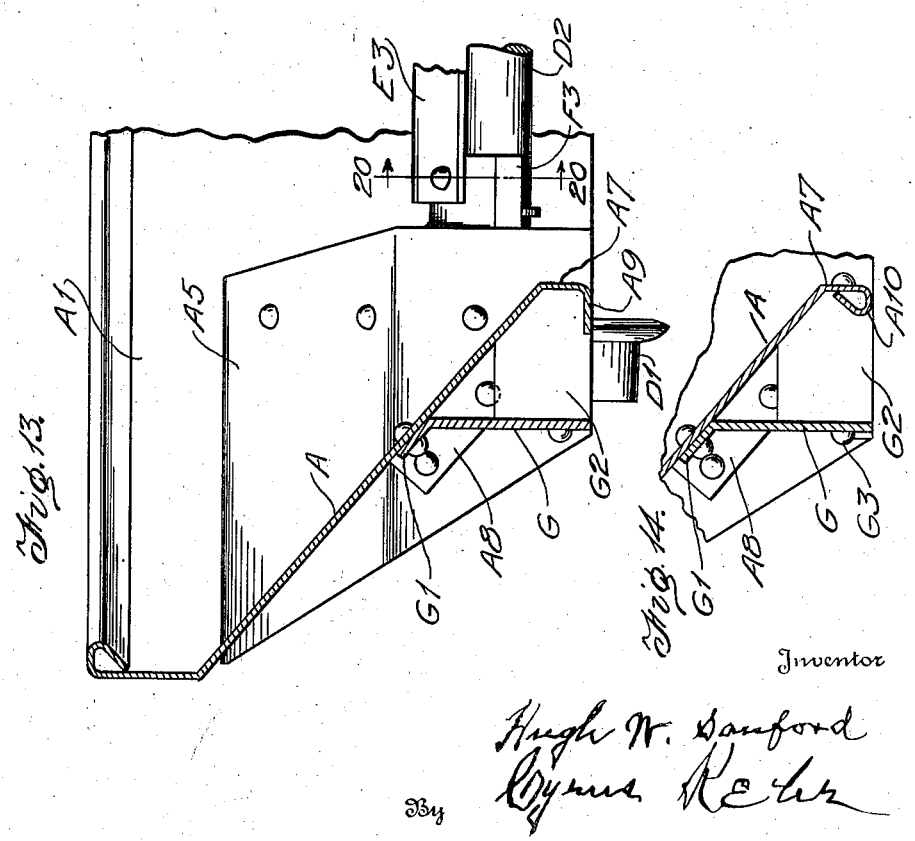
Inventor
Hugh W. Sanford
By Cyrus Kehr
Attorney Oct. 12, 1937.  H. W. SANFORD  2,095,348
DROP BOTTOM MINE CAR
Original Filed Dec. 17, 1932   8 Sheets-Sheet 7
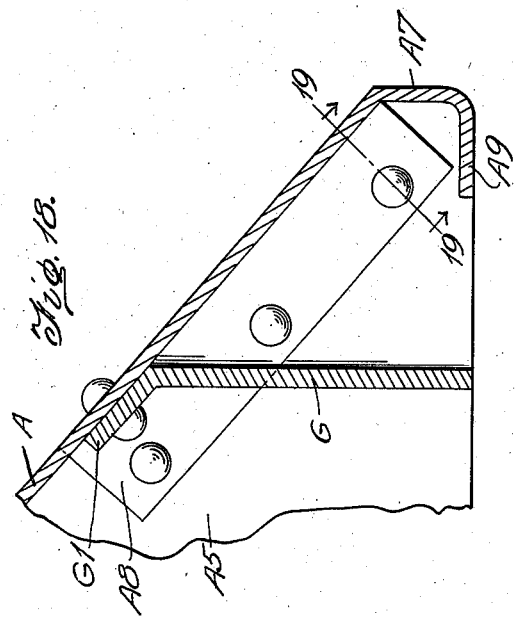
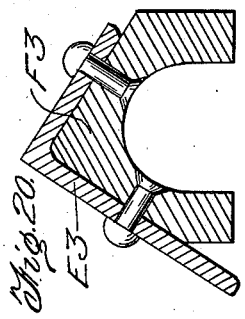
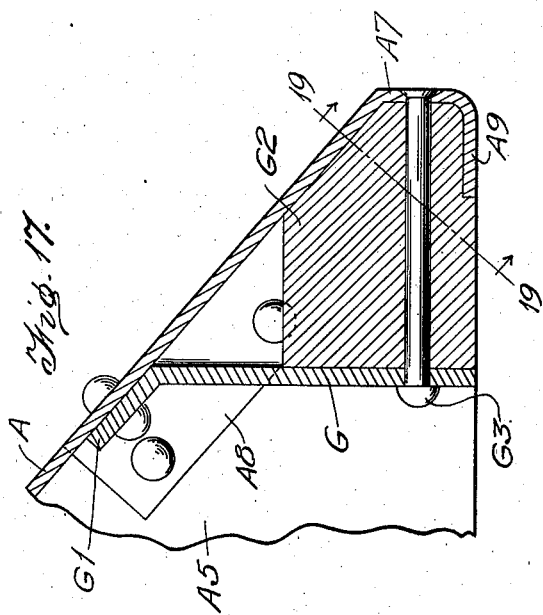
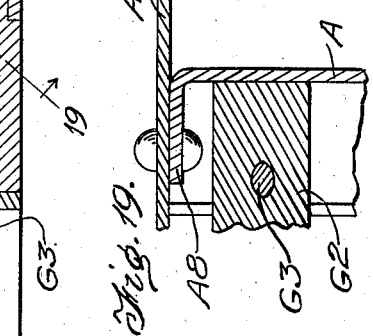

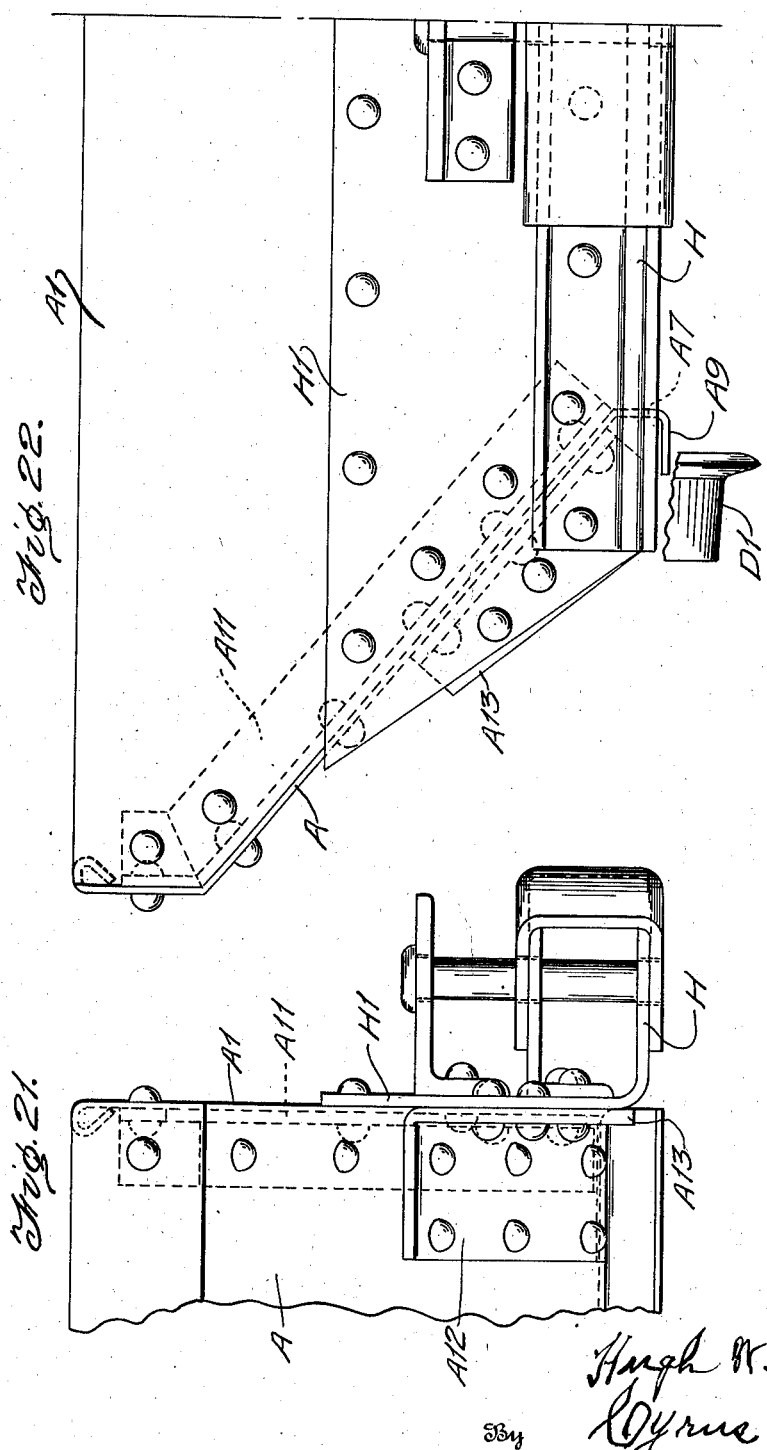

Patented Oct. 12, 1937

2,095,348

UNITED STATES PATENT OFFICE 2,095,348

DROP BOTTOM MINE CAR

Hugh W. Sanford, Knoxville, Tenn.

Continuation of application Serial No. 647,795, December 17, 1932. This application May 21, 1935, Serial No. 22,661

REISSUED
JUL 2 2 1941

59 Claims. (Cl. 105—364)

This application is a continuation of my application Serial No. 647,795, filed December 17, 1932.

This invention relates to drop bottom mine cars and its object is to obtain a very large capacity with a low height and a wide top.

The capacity of drop bottom cars for the same overall dimensions is less than the maximum capacity of rotary cars or end dump cars, because in the drop bottom cars, the flare plates or wing bottoms must slope at an angle to the horizontal greater than the angle of repose of the lading material. In end dump cars and rotary cars on the contrary, the side wing bottoms can be flatly horizontal and no upward slope is required. Since, however, carrying capacity is one of the essential points of a mine car, it is essential that the drop bottom car be designed to give the very maximum capacity for the same over-all dimensions. This invention provides a drop bottom car having a capacity comparable with that of an ordinary rotary car with the same over-all dimensions. At the same time, the design is simple and comparatively inexpensive.

In drop bottom mine cars which have been used heretofore where side sills are located on the inside of the wheels, the side plates slope off at an angle of about 35 to 40 degrees from the horizontal, and with the side plates meeting the side sills so as to shed the coal over the tops of the side sills. The side plates are indented slightly to form hoods over the wheels. With a certain angle of slope on the side plate, it is impossible to get a very wide car without having a very high car at the same time.

In order to get greater width in drop bottom mine cars without an increase in the height, it has been proposed to locate the side sills outside of the wheels but this is somewhat objectionable, because of the extra cost and complication of manufacture. It is difficult to get the wheels off of the car without special truck construction and the end bumper sills must be made wide enough to meet these outside sills. This makes a very wide bumper which must be exceedingly strong to carry the haulage strains over this width.

My present invention locates the side sills on the inside of the wheels and yet the slope of the side plates cuts the wheels at a low point with hoods extending over the wheels. This enables the wheels to be readily removed.

This construction is made possible by the use of a side sill with a low vertical flange. In fact, the side sill is disposed almost entirely below the plane of the axle. I reinforce the side sill at the point where it is penetrated by the axle and/or wheel by means of a casting which may be securely attached to or formed integral with the side sill and which casting has the top of the hood extending therefrom. The casting reinforces the angle bar side sill to the proper extent to build back the strength of the side sill for taking all loads vertically, transversely and longitudinally. The casting acts as a pedestal box as well as a part of the hood. By its use, the hood construction will be very much simplified and reduced in cost. The casting may also act as a wedge for the drop bottom doors, where it is desirable to wedge the doors into position when they are closed.

In the accompanying drawings,

Fig. 1 is a side elevation of a mine car to which the invention is applied;

Fig. 2 is an end elevation thereof;

Fig. 3 is an enlarged side elevation of a portion of the car with the wheel and axle removed;

Fig. 4 is a transverse sectional view therethrough;

Fig. 5 is a side elevation of the casting detached;

Fig. 6 is a top plan view thereof;

Fig. 7 is a side elevation showing the inner side of the casting opposite from that shown in Fig. 5;

Fig. 8 is an edge view of the casting;

Fig. 9 is a similar view of the opposite edge thereof;

Fig. 10 is a partial side elevation showing a somewhat different form of the invention;

Fig. 11 is a vertical sectional view therethrough on the line 11—11, of Fig. 10;

Fig. 12 is a horizontal sectional view of the pedestal member detached, taken approximately on the line 12—12 of Fig. 10;

Fig. 13 is a vertical sectional view on the line 13—13, of Fig. 10;

Fig. 14 is a detail of a similar view showing the lower edge of the sloping side rolled;

Fig. 15 is an inside elevation of the pedestal member shown in Figs. 10 to 12;

Fig. 16 is a top plan view thereof;

Fig. 17 is a detail sectional view on the line 17—17 of Fig. 10;

Fig. 18 is a similar view on the line 18—18 of Fig. 10;

Fig. 19 is a detail sectional view taken approximately on the lines 19—19 of Figs. 17 and 18;

Fig. 20 is a sectional view on the line 20—20 of Fig. 13;

Fig. 21 is a side elevation of a portion of the car body structure showing the attachment of the bumper thereto; and Fig. 22 is a vertical end elevation of the same.

The car body is provided with sides A, and ends A1, the sides A being sloping to shed into a central opening controlled by drop bottom doors, A2, which form the bottom of the car, although the invention is not limited to any particular kind of drop bottom doors or in fact to whether or not the bottom is stationary or provided with doors.

Side sills B support the body and have the usual combined bumper and draw bar structure C, connected therewith, which are also connected with the end walls, A1.

The doors A2 are shown for purposes of illustration as three in number and are hinged for successive dropping, being released automatically by the lever A3, at an end of the car.

The side sills B are shown in Fig. 4 as of angle bar construction having an upright flange B1, and a bottom flange B2, as represented particularly in Figs. 3 and 4. The upright flange B1 is notched out as at B3 to receive the hub D of the wheel, D1. The axle D2, is supported by the wheel D1. The upright flange B1 of the side sill B, is disposed relatively close to the flange of the car wheel, but the upper edge of the flange B1, preferably terminates at a point below the horizontal plane of the upper edge of the car axles, D2. The sloping side A extends downwardly to the upper edge of the side sill flange B1 and is secured to the side sill B, but as shown in Fig. 4, the low termination of said flange disposes the plane of the sloping side at a point well below the upper edge of the car wheel. The slope of the sides A should be at an angle of greater than 33 degrees to a horizontal plane, the slope shown being approximately 38 degrees, for complete discharge of the lading by gravity into the central opening.

The sloping sides A are notched out as at A4 to receive the hoods, A5, which extend over the wheels, D1.

In order to reinforce the side sills at the points of the notches B3, where hubs D, and axles D2 penetrate and for other purposes, pedestal members E are inserted within the angle bar side sills between the flanges B1 and B2 and are of sufficient height to serve as the inner closure walls of wheel hoods A5 and to support the inner edges of the tops of said wheel hoods. The pedestal member is provided with a friction bearing opening E6 for loosely receiving the axle D2, forming a boxing around the axle and permitting free withdrawal of the axle therefrom. These pedestal members are shown as of cast construction, each having an upper flange E1, to which the inner edge of the hood A5 is bolted or riveted or otherwise secured. The pedestal members thus not only reinforce the side sills, but they also support the inner edges of the tops of the wheel hoods and provide very deep wheel hoods into the low sloping sides. At the same time, the hoods act as truss members to support the sides of the car. In the form shown, the hoods A5 together with the pedestal members E form hood-structures, of which the inner closure walls are of cast metal.

The pedestal member E, has a horizontally disposed angular projection E2 formed on the inner face thereof to which is bolted or riveted a tie angle E3, which extends transversely of the car body and is attached to the corresponding pedestal on the opposite side in a similar manner. This serves as a truss between the opposite sides of the car and between the oppositely disposed wheel hoods and also as a hood over the axles.

Formed on the inner face of the pedestal member, E is a plate member E4 which may be of the shape as shown in Fig. 7, wherein it receives an end of the hinge rod, A6 which supports a door A2. If this invention is used in a drop bottom car which wedges the doors back in place when they come into their closed positions, the edge E5 of the plate member E4 serves as such a wedge.

The pedestal members therefore support the inner edges of the tops of the wheel hoods as well as tie the oppositely disposed wheel hoods together through tie members, thereby tying the opposite sides together. They form trusses over the tops of the axles where the axles and wheel hubs cut through the side sills, so that the ends of the side sills will not droop. By means of these pedestal members, all of the strength necessary for supporting the end load is restored to the construction. The wheel hood itself in this construction has sufficient depth to serve as a gusset strengthening member to support the load on the flare plate of the car body side between the two ends of the car. The pedestal member forms the vertical end member for the hood and may be brought much closer to the wheel flange than with the old form of side sills. At the same time, the side sills are inside the wheels and are much lower in height, terminating at points below the tops of the axles. This permits the flare plate to go off at a very much lower level which together with the increased width of door opening provided at the bottom gives a substantial increase in the capacity of the car without an increase in its height.

The lower edges of the flare plates of the sides A, terminate in down turned portions A7, which define the edges of the door openings which construction provides door openings of greater width than has been usually permitted heretofore.

While I have shown the pedestal members E as of cast construction, yet it may be found desirable to make them merely of plates which will be sufficient for the purpose or they may be formed integral with the side sills, but it is preferable to have the pedestal members separate from the sills.

Referring to Figs. 10 and 11 of the drawings, wherein I have shown a somewhat different form of the invention, the sloping sides A have outturned flanges A8 between which hoods A5, are disposed and secured, each hood having its top supported at its inner edge by a pedestal member designated in these figures by the character F, which is used in a similar manner to the pedestal member E, described above but it has an offset portion F1 receiving the hub D of the wheel D1, and also having an opening F2, through which the axle D2, extends. The projection F3, receives an end of the tie member E3 secured thereto.

The sloping sides A have longitudinal bracing members G extending therealong between adjacent hoods A5, and between the hoods and the ends of the car and with flanged upper edges G1 attached to the sloping sides A thereby forming a box girder construction. Filler blocks G2 are arranged at intervals between the bracing members G and the sloping sides A, being securely held in place as by rivets or other fastening means G3 passing through the filler blocks, the bracing members and the portions A7 of the sloping sides. The lower edges of the portions A7 may be turned outward horizontally as at A9 in Fig. 13 or may be rolled up as at A10 in Fig. 14, in order to brace or reinforce the extreme lower edge of the sloping side.

The use of the upright bracing members G which extend approximately from end to end of the car, reinforcing the sloping sides gives sufficient rigidity to the side plates so that they will securely support the ends of the car. This structure forms a box girder construction out of the side plates from the wheels to the ends of the car with sufficient rigidity for holding up the load against drooping.

The supporting of the end sill by the sloping sides is shown in Figs. 21 and 22. The end sill structure is designated generally by the character H, and has an upright plate H1, abutting against the end A1 of the car body.

The lower edge of this plate is turned horizontally and serves as a shelf on which the bumper block rests. Corner angles A11 between the sides A and the ends A1 extend downward far enough to be riveted or otherwise secured to this plate H1. On the outside of the side A is a flat gusset which is riveted or otherwise secured to the sloping side A and has an outturned flange A13 riveted or otherwise secured to the bumper plate H1. This forms a secure support for the bumper structures from the sloping sides of the car.

This structure of the car body is such as to dispose the edges of the drop bottom doors close to the inside faces of the wheels and in fact a distance less than four inches, providing only a working clearance therebetween and the longitudinal walls of the hood coverings and the car body sides are approximately at the edges of the doors. The planes of the sloping sides A start from a very low point and cut the wheels approximately midway of their heights with the inner edges of the slopes starting at a point below the horizontal plane of the top edges of the axles thereby providing greatly increased capacity for the car.

I claim as my invention:

1. In a vehicle, the combination in a lading body, of a central drop door portion, and stationary side wing-portions sloped at angles greater than 33 degrees to a horizontal plane and adapted for the complete discharge of loose coal or other lading through the dropped doors, side sill-members supporting the side wing-portions of the body, wheels disposed outside of said sill-members and supporting the same; axles for the wheels, the treads of the wheels projecting deeply into the side wing-portions, and deeply recessed wheel-hood coverings over the tops of the wheels, the inner portions of the side wing-portions meeting the sill members at points below the horizontal plane of the tops of the axles.

2. In a vehicle, the combination in a lading body, of a central drop door portion, and stationary side wing-portions, said side wing-portions being sloped at angles greater than 33 degrees to a horizontal plane for the complete discharge of coal or other loose lading into the central portion, wheels with treads projecting deeply into the side wing-portions, axles for the wheels, deeply recessed wheel-hood coverings connected with the wing-portions and disposed over the tops of the wheels, and longitudinally extending sill-members inside the wheels, the inner portions of the side wing-portions meeting the sill-members at points below the horizontal plane of the tops of the axles.

3. In a drop-bottom coal mining or similar rail car, the combination in a lading body, of a central drop door portion, and stationary side wing-portions, said side wing-portions being sloped at angles greater than 33 degrees to a horizontal plane for the complete discharge of coal or other loose lading into the central portion, car wheels with treads projecting deeply into the side wing-portions, deeply recessed wheel-hood coverings connected with the wing-portions and disposed over the tops of the wheels, longitudinally extending sill-members inside the wheels, and car axles associated with the wheels and supporting the sill-members, the inner portions of the side wing-portions meeting the sill-members at points below the horizontal plane of the tops of the axles.

4. In a drop-bottom coal mining or similar rail car, the combination in a lading body, of a central drop door portion, and stationary side wing-portions sloped at angles greater than 33 degrees to a horizontal plane and adapted for the complete discharge of coal or other loose lading through the drop door portion, car wheels projecting deeply into the sloping side wing-portions, axles for the wheels, the plane of the sloping side wing-portions cutting through the upright outer edge line of the adjacent car wheel outside of the track gauge line, and longitudinal side sill-members disposed inside the wheels, the inner portions of the side wing-portions meeting the sill-members at points below the horizontal plane of the tops of the axles.

5. In a drop-bottom coal mining or similar rail car, the combination in a lading body, of a central drop door portion, and stationary side wing-portions sloped at angles greater than 33 degrees to a horizontal plane and adapted for the complete discharge of coal or other loose lading through the drop door portion, car wheels projecting deeply into the sloping side wing-portions, the plane of the sloping side wing-portions cutting through the upright outer edge line of the adjacent car wheel outside of the track gauge line, longitudinal side sill-members disposed inside the wheels, deeply recessed wheel-hood coverings over the tops of the wheels, said hood coverings being sloped so as not to prevent the discharge of the lading into the central portion, the side sill-members supporting the wing-portions, and axles supporting the said sill-members and having spindles for the wheels, the inner portions of the side wing-portions meeting the sill-members at points below the horizontal plane of the tops of the axle spindles.

6. In a vehicle, the combination in a lading body, of a central drop door portion, and stationary side wing-portions sloped to discharge into the central portion, wheels and axles, and longitudinal side sill-members carried thereby and supporting the side wing-portions, the inner edges of the sloping side wing-portions being joined to the side sill-members at points below the horizontal plane of the tops of the axles.

7. In a four wheel mine or similar rail car, the combination in a lading body, of car wheels, a central portion lying entirely between standard track rails, side wing-portions sloped to discharge into the central portion, drop doors for the central portion, deep hood-coverings for the wheels and connected with the side wing-portions, axles supported by the wheels, and side sills associated with the axles and supporting the side wing-portions inside the wheels, the sloping side wing-portions being joined to the side sills at points below the horizontal plane of the tops of the axles.

8. In a vehicle, the combination in a lading body, of a central portion and side wing-portions sloped to discharge into the central portion, drop-doors for the central portion, wheels projecting deeply into the sloping side wing-portions, hood-coverings extending over the wheels, axles associated with the wheels, and side sill-members with substantially upright portions and supported by the axles inside the wheels and having upper edges of the upright portions disposed below the horizontal plane of the tops of the axles.

9. In a vehicle, the combination in a lading body, of a central portion and side wing-portions sloped to discharge into the central portion, drop doors for the central portion, wheels projecting deeply into the sloping side wing-portions, hood-coverings extending over the wheels, axles associated with the wheels, and side sill-members with substantially upright portions and supported by the axles inside the wheels and having upper edges of the upright portions disposed below the horizontal plane of the tops of the axles, the sloping side wing-portions extending over the upper edges of the side sill-members at points beneath the plane of the tops of the axles.

10. In a drop-bottom mining or similar rail car with a lading body having a central portion and side wing-portions, the combination of car wheels, a plurality of drop doors located at least in substantial part below the horizontal plane of the axes of the car wheels, car axles, stationary lading bottoms to the side wing-portions extending on slopes to points below the horizontal plane of the tops of the car axles, whereby the lading is discharged through openings made by the dropping of the doors, and for complete discharge between standard track rails, car wheels projecting deeply into said side wing-portions of the lading body, deeply recessed hood-coverings over the tops of the wheels and sloped so as not to prevent the discharge of the lading through the dropped bottom doors, and load-supporting sill-members extending longitudinally of the body and located between two oppositely disposed wheels and located below the sloping bottoms of the side wing-portions.

11. In a mine or similar rail car with a lading body having a central portion and side wing-portions, car wheels extending deeply into the side wing-portions, car axles, and a bottom to the lading body having at least substantial portions located below the horizontal plane of the axes of the car wheels, the combination of longitudinal load-supporting sill-members for said lading body having substantially upright portions lying between the oppositely disposed car wheels, pedestal members attached to the sill-members and extending upwardly therefrom, said pedestal members having friction bearings for the axles, and wheel hoods attached to the side wing-portions of the lading body structure and extending over the pedestal members.

12. In a mine or other rail car with a lading body having a central portion and side wing-portions, car wheels extending deeply into the side wing-portions, car axles extending from side to side of the car and connected at their opposite ends with the wheels, and a bottom to the lading body having at least substantial portions located below the horizontal plane of the axes of the wheels, the combination of longitudinal load supporting sill members for said lading body having substantially upright portions lying between the oppositely disposed car wheels, pedestal members attached to the sill members and extending upwardly therefrom, said pedestal members having supporting bearings for the axles in a loose relationship constructed for free withdrawal of the axles therefrom, and wheel hoods attached to the side wing-portions of the lading body structure and extending over the pedestal members.

13. In a mine or similar rail car with a lading body having side wing-portions, car wheels extending deeply into the side wing-portions, car axles, and a bottom for the lading body having at least substantial portions thereof located below the horizontal plane of the axes of the car-wheels, the combination of longitudinal load supporting sill members for said lading body having substantially upright portions between the oppositely disposed car wheels, pedestal members attached to the sill members and extending upwardly therefrom, said pedestal members having supporting bearings receiving the axles in a loose relationship being constructed for free withdrawal of the axles therefrom, and wheel hoods attached to the pedestal members and extending over the wheels.

14. In a four wheel mine car, the combination in a lading body, of a central portion and side wing-portions sloped to discharge into the central portion, side sills supporting the side wing-portions, pedestal members reinforcing the side sills and extending upwardly therefrom, said pedestal members having axle receiving friction bearings therein, and wheel-hoods attached to the side wing-portions and to the pedestal members.

15. In a four-wheel mine car having car wheels, and car axles extending from side to side of the car and connected with the wheels, the combination in a lading body of a central portion and side wing-portions sloped to discharge into the central portion, side sills supporting the side wing-portions, pedestal members reinforcing the side sills and extending upwardly therefrom, said pedestal members having supporting bearings for the axles in a loose relationship constructed for free withdrawal of the axles therefrom, and wheel hoods attached to the side wing-portions and to the pedestal members.

16. In a vehicle, the combination in a lading body, of a central portion having drop doors, side wing-portions sloped to discharge into the central portion, wheels projecting deeply into the sloping side wing-portions, axle members carried by the wheels, side sills carried by the axle members and supporting the side wing-portions, side sill reinforcing members connected therewith and extending upwardly to points above the side sills, and wheel-hood coverings extending over the wheels and attached to the sloping side wing-portions, said hood-coverings having the inner edges thereof attached to the side sill reinforcing members.

17. In a drop-bottom mine or similar rail car, the combination in a lading body, of side wing portions having a central opening therebetween and sloped to discharge into said central opening, drop-door means for closing said central opening, wheels projecting deeply into the sloping side wing-portions, side sills carried by the wheels and supporting the side wing portions, side sill reinforcing members connected therewith and extending upwardly therefrom to points above the upper edges of the side sills and extending longitudinally of the car, said reinforcing members having the inner faces of the main portions thereof approximately in the vertical planes of the edges of the central opening, and wheel-hood coverings extending over the wheels and having their inner edges attached to the upper edges of the side sill reinforcing members.

18. In a mine or similar rail car, the combination of a side sill having an upright section, said upright section having an opening therein for receiving the hub portion of a wheel, and a reinforcing member for the side sill having an axle receiving opening therein cooperating with the upright section, said axle receiving opening being arranged with the top thereof above the top of the upright section of the side sill.

19. In a four wheel mine car, the combination of a side sill having upright and horizontal flanges, the upright flange having a notch in the upper edge thereof and of sufficient size for receiving a hub portion of a flanged wheel, said upright flange being disposed relatively close to the inner face of the wheel flange and having the horizontal flange extending inwardly from said upright flange of the side sill, a reinforcing member attached to the side sill between the horizontal and upright flanges and abutting the upright flange in position to reinforce the edges of the notch, said reinforcing member extending above the upper edge of the side sill and having an axle receiving opening therein for cooperating with the wheel hub receiving notch in the upright flange.

20. In a four wheel mine car, the combination of a side sill having upright and horizontal flanges, said upright flange having a notch in the upper edge thereof and of sufficient size and positioned to receive a hub portion of a flanged wheel, a combined wheel and axle structure having a wheel hub portion projecting into said notch, the upright flange of the side sill being disposed relatively close to the wheel flange and having the horizontal flange of the side sill projecting inwardly from the wheel, and a side sill reinforcing member extending above the upper edge of the side sill and having a portion abutting and reinforcing the edges of the opening, said member having an axle receiving opening therein.

21. In a vehicle, the combination of side sills having upright sections, wheel and axle structures supporting the side sills, pedestal members secured to the side sills and having inwardly extending flange projections carried thereby, and a tie member secured to the flange projections of opposite pedestal members and extending across between said members, the major portion of said tie member being disposed above the upright sections of the side sills.

22. In a dumping mine or similar rail car having car wheels and car axles, and a lading body with a central portion having a bottom including a plurality of transversely hinged drop doors located at least in substantial part below the horizontal plane of the axes of the car wheels and with side wing-portions having stationary bottoms sloped upwardly and outwardly whereby coal or other loose lading may be completely discharged through the dropped doors and between the standard track rails of the car, the combination of load-supporting longitudinal sill-members for said lading body located between two oppositely disposed car wheels and having upright portions lying entirely below the horizontal plane of the tops of the car axles.

23. In a dumping mine or similar rail car having car wheels and car axles, and a lading body with a central portion having a bottom including a plurality of transversely hinged drop doors located at least in substantial part below the horizontal plane of the axes of the car wheels and with side wing-portions having stationary bottoms sloped upwardly and outwardly whereby coal or other loose lading may be completely discharged through the dropped doors and between the standard track rails of the car, the combination of longitudinal load-supporting sill structures for said lading body located between two oppositely disposed car wheels and having substantially upright faces in substantially upright planes, the said upright faces affording sealing relationship with the edges of the closed doors and being located entirely below the horizontal plane of the tops of the car axles.

24. In a bottom dumping mine or similar rail car, the combination of car wheels, car axles, a plurality of transversely hinged drop doors located at least in substantial part below the horizontal plane of the axes of the car wheels, and car structure comprising hopper shaped wing-portions with stationary bottoms sloped for the complete discharge of coal or other loose lading between standard track rails, said stationary bottoms merging into substantially upright portions located entirely below the horizontal plane of the tops of the axles and serving as sealing walls for the edges of the closed doors, and axle support-means attached to the car structure and located laterally inside the wheels.

25. In a bottom dumping mine or similar rail car, the combination of car wheels, car axles, a plurality of transversely hinged drop doors located at least in substantial part below the horizontal plane of the axes of the car wheels, hopper shaped wing-portions with stationary bottoms sloped for the complete discharge of coal or other loose lading between standard track rails, said stationary bottoms merging into substantially upright portions located entirely below the horizontal plane of the tops of the axles and serving as sealing walls for the edges of the closed doors, and metallic sections located below the sloping stationary bottoms and between the edges of the closed doors and the adjacent car wheels, said sections serving at least in part as longitudinal means for supporting the lading load.

26. In a bottom dumping mine or similar rail car, the combination of car wheels, car axles, a plurality of transversely hinged drop doors located at least in substantial part below the horizontal plane of the axes of the car wheels, hopper shaped wing-portions with stationary bottoms sloped for the complete discharge of coal or other loose lading between standard track rails, said stationary bottoms merging into substantially upright portions located entirely below the horizontal plane of the tops of the axles and serving as sealing walls for the edges of the closed doors, and metallic sections located below the sloping stationary bottoms and between the edges of the closed doors and the adjacent car wheels, each of the said sections having a portion located substantially in a horizontal plane and another portion substantially in an upright plane and said sections serving at least in part as longitudinal means for supporting the lading load.

27. In a drop-bottom mine or similar rail car, the combination of car wheels, car axles, a lading body with a substantially horizontal central portion and wing-portions sloped upwardly from the central portion for the discharge of all the lading into the central portion, drop doors lying at least in substantial part below the horizontal plane of the axes of the car wheels and located entirely between oppositely disposed car wheels, sloped stationary bottoms for the wing-portions of the lading body which sloped bottoms lie in planes cutting through the upright edge lines of the adjacent car wheels outside the track gauge lines, and the said wing bottoms rising on slopes from a level below the horizontal plane of the axes of the car wheels, deep hood-coverings over the car wheels, and longitudinal load-supporting flanged metal sections lying between oppositely disposed car wheels and underneath the slope of the wing-bottoms.

28. In a drop-bottom mine or similar rail car, the combination of car wheels, car axles, a lading body with a substantially horizontal central portion and wing-portions sloped upwardly from the central portion for the discharge of all the lading into the central portion, drop doors lying at least in substantial part below the horizontal plane of the axes of the car wheels and located entirely between oppositely disposed car wheels, sloped stationary bottoms for the wing-portions of the lading body which sloped bottoms lie in planes cutting through the upright edge lines of the adjacent car wheels outside the track gauge lines, and the said wing bottoms rising on slopes from a level below the horizontal plane of the axes of the car wheels, deep hood-coverings over the car wheels, and longitudinal load-supporting flanged metal sections lying between oppositely disposed car wheels and underneath the slope of the wing-bottoms, the side wing-portions having substantially upright walls serving as sealing walls for the edges of the drop doors.

29. In a drop-bottom mine or similar rail car, the combination of car wheels, car axles, a lading body with a substantially horizontal central portion and wing-portions sloped upwardly from the central portion for the discharge of all the lading into the central portion, drop doors lying at least in substantial part below the horizontal plane of the axes of the car wheels and located entirely between oppositely disposed car wheels, sloped stationary bottoms for the wing-portions of the lading body which sloped bottoms lie in planes cutting through the upright edge lines of the adjacent car wheels outside the track gauge lines, and the said wing bottoms rising on slopes from a level below the horizontal plane of the axes of the car wheels, deep hood-coverings over the car wheels, and longitudinal load-supporting metal sections lying between oppositely disposed car wheels, the hood-coverings having upright longitudinal walls located substantially in the same upright planes as the adjacent edges of the drop doors, and the hood-coverings having transverse walls engaging the sloping side wing-bottoms above and below the horizontal plane of the axes of the car wheels.

30. In a drop-bottom mine or similar rail car, the combination of car wheels, car axles, a lading body with a substantially horizontal central portion and wing-portions sloped upwardly from the central portion for the discharge of all the lading into the central portion, drop doors lying at least in substantial part below the horizontal plane of the axes of the car wheels and located entirely between oppositely disposed car wheels, sloped stationary bottoms for the wing-portions of the lading body which sloped bottoms lie in planes cutting through the upright edge lines of the adjacent car wheels outside the track gauge lines, and the said wing bottoms rising on slopes from a level below the horizontal plane of the axes of the car wheels, deep hood-coverings over the car wheels, and longitudinal load-supporting flanged metal sections lying between oppositely disposed car wheels and underneath the slope of the wing-bottoms, the hood-coverings having upright longitudinal walls located substantially in the same upright planes as the adjacent edges of the drop doors, and the hood-coverings having transverse walls engaging the sloping side wing-bottoms above and below the horizontal plane of the axes of the car wheels.

31. In a drop-bottom mine or similar rail car, the combination of car wheels, car axles, a lading body with a substantially horizontal central portion and wing-portions sloped upwardly from the central portion for the discharge of all the lading into the central portion, drop doors lying at least in substantial part below the horizontal plane of the axes of the car wheels and located entirely between oppositely disposed car wheels, sloped stationary bottoms for the wing-portions of the lading body which sloped bottoms lie in planes cutting through the upright edge lines of the adjacent car wheels outside the track gauge lines, and the said wing bottoms rising on slopes from a level below the horizontal plane of the axes of the car wheels, deep hood-coverings over the car wheels, and longitudinal load-supporting flanged metal sections lying between oppositely disposed car wheels and underneath the slope of the wing-bottoms, the hood-coverings having upright longitudinal walls substantially in the same upright planes as the adjacent edges of the drop doors and said upright walls being located close to the flanges of the adjacent car wheels whereby there are only working clearances between the car wheels and said walls.

32. In a vehicle, the combination of axles, wheels, a lading bottom lying at least in substantial part below the horizontal plane of the axes of the wheels, a lading body having stationary side wing-portions, transverse sheet metal hood-coverings over the wheels and fastened to the wing-bottoms, and pedestal members supported by the axles and having substantially upright walls above the level of the tops of the axles which serve as side closure walls for the lading body near the wheels and at least in part as supporting walls for the inside ends of the sheet metal hood-coverings.

33. In a mine or similar rail car, the combination of car axles, car wheels, a lading bottom lying at least in substantial part below the horizontal plane of the axes of the car wheels, a lading body having stationary side wing-portions, transverse sheet metal hood-coverings over the car wheels and fastened to the wing-bottoms, and integral cast metal pedestal members supported by the car axles and having substantially upright walls above the level of the tops of the axles which serve as side closure walls for the lading body near the car wheels and at least in part as supporting walls for the inside ends of the sheet metal hood-coverings.

34. In a vehicle, the combination of axles, wheels, a lading bottom lying at least in substantial part below the horizontal plane of the axes of the wheels, a lading body having stationary side wing-portions, transverse sheet metal hood-coverings over the wheels and fastened to the wing-bottoms, and pedestal members supported by the axles and having substantially upright walls above the level of the tops of the axles which serve as side closure walls for the lading body near the wheels and at least in part as supporting walls for the inside ends of the sheet metal hood-coverings, and transverse tie bars connecting oppositely disposed pedestal members.

35. In a drop bottom coal mining or similar rail car, the combination of car wheels, car axles, car structure comprising a central lading body portion with drop bottom doors and disposed entirely between standard track rails, side wing portions having stationary wing-bottoms with sections sloping downwardly from points outside the car wheels in planes cutting the outside upright lines of the cross sections of the adjacent wheels well below the top tread lines, deep metal hood-coverings extending transversely over the tops of the car wheels, the transverse walls of the said hood-coverings intersecting said sloping sections of the wing-bottoms in lines which extend below the horizontal plane of the axes of the car wheels, and axle support-means attached to the car structure and located laterally inside the wheels.

36. In a drop bottom coal mining or similar rail car, the combination of car wheels, car axles, car structure comprising a central lading body portion with drop bottom doors and disposed entirely between standard track rails, side wing portions having stationary wing-bottoms with sections sloping downwardly from points outside the car wheels in planes cutting the outside upright lines of the cross sections of the adjacent wheels well below the top tread lines, deep metal hood-coverings extending transversely over the tops of the car wheels, the transverse walls of the said hood-coverings intersecting said sloping sections of the wing-bottoms in lines which extend below the horizontal plane of the axes of the car wheels, and axle support-means attached to the car structure and located laterally inside the wheels.

37. In a drop bottom coal mining or similar rail car, the combination of car wheels, car axles, a central lading body portion with drop bottom doors and disposed entirely between standard track rails, side wing portions having stationary wing-bottoms with sections sloping downwardly from points outside the car wheels in planes cutting the outside upright lines of the cross sections of the adjacent wheels well below the top tread lines, deep metal hood-coverings extending transversely over the tops of the car wheels, the transverse walls of the said hood-coverings intersecting said sloping sections of the wing-bottoms in lines which extend below the horizontal plane of the axes of the car wheels, the wing-bottoms being flanged downwardly at the bottom of the slopes into longitudinal upright wall-sections, which upright sections are stiffened at the lower portions by outwardly projecting flanges whereby longitudinal beam members are formed for supporting the lading load.

38. In a drop bottom coal mining or similar rail car, the combination of car wheels, car axles, a central lading body portion with drop bottom doors and disposed entirely between standard track rails, side wing portions having stationary wing-bottoms with sections sloping downwardly from points outside the car wheels in planes cutting the outside upright lines of the cross sections of the adjacent wheels well below the top tread lines, deep metal hood-coverings extending transversely over the tops of the car wheels, the transverse walls of the said hood-coverings intersecting said sloping sections of the wing-bottoms in lines which extend below the horizontal plane of the axes of the car wheels, longitudinal load-supporting sill-members inside the car wheels and having upright sill sections lying entirely below the horizontal plane of the axes of the car wheels, and longitudinal flanged metal load-supporting means located outside the track rails and underneath and attached to the under side of the wing-bottoms.

39. In a vehicle with wheels and axles, the combination of a lading body with stationary wing-bottoms sloping upwardly and outwardly in planes which cut through the adjacent wheels, longitudinal load-supporting stiffened sill-sections with their lower portions located inside the wheels and lying entirely below the horizontal plane of the axes of the wheels, and transversely hinged drop-doors between the wheels and at least in substantial part below the horizontal plane of the axes of the wheels and with each of their longitudinal sealing edges located in planes at a distance of less than four inches from the upright plane of the inside of the treads of the adjacent wheels.

40. In a bottom-dumping mine or similar rail car, the combination in a lading body, of a central portion and side wing-portions sloped to discharge into the central portion, discharge doors for the central portion, wheels projecting into the sloping side wing-portions, axles for the wheels, hood coverings extending over the wheels, longitudinal side sill-members having substantially upright portions located between the upright planes of the inside faces of oppositely disposed wheels, axle supporting bearings attached to the side sill-members, apertures in said axle supporting bearings for receiving the axles, the tops of the apertures at one side of the car being located in a horizontal plane which intersects the plane of the sloping side wing-portion of the lading body outwardly of the vertical plane of the sill member at the same side of the car.

41. In a bottom-dumping mine or similar rail car, the combination in a lading body, of a central portion and side wing-portions sloped to discharge into the central portion, discharge doors for the central portion, wheels projecting into the sloping side wing-portions, axles for the wheels, hood coverings extending over the wheels, longitudinal side sill-members having substantially upright portions located between the upright planes of the inside faces of oppositely disposed wheels, axle supporting bearings attached to the side sill-members, apertures in said axle supporting bearings for receiving the axles, the tops of the apertures at one side of the car being located in a horizontal plane which intersects the plane of the sloping side wing-portion of the lading body outwardly of the vertical plane of the sill member at the same side of the car, and tie members extending between oppositely disposed axle supporting bearings above the axles and attached to said axle supporting bearings.

42. In a bottom-dumping mine or similar rail car, the combination in a lading body, of a central portion, side wing portions sloped to discharge into the central portion, discharge doors for the central portion, wheels projecting into adjacent sloping side wing portions, axles for the wheels, hood coverings for the wheels, longitudinal load-supporting side sill-members having their lowest portions located between the upright planes of the inside faces of oppositely disposed wheels, and support-bearings for the axles attached to the side sill-members, each of said bearings having a substantially upright web the inside upright plane of the innermost part of which cuts the horizontal plane of the uppermost part of the axle in said bearing at a point located within the cross-sectional area of the lading body at a section through the sloping side wing-portions.

43. In a bottom-dumping mine or similar rail car, the combination in a lading body, of a central portion, side wing portions sloped to discharge into the central portion, discharge doors for the central portion, wheels projecting into adjacent sloping side wing portions, axles for the wheels, hood coverings for the wheels, longitudinal load-supporting side sill-members having their lowest portions located between upright planes of the inside faces of oppositely disposed wheels, support-bearings for the axles attached to the side sill-members, each of said bearings having a substantially upright web the inside upright plane of the innermost part of which cuts the horizontal plane of the uppermost part of the axle in said bearing at a point located within the cross-sectional area of the lading body at a section through the sloping side wing-portions, and tie members extending between parts of said oppositely disposed support-bearings above the axles and said tie members being attached to said support-bearings.

44. In a mine or similar rail car with a lading body having a central portion and side wing-portions, car wheels extending deeply into the side wing-portions, car axles, and a bottom to the lading body having at least substantial portions located below the horizontal plane of the axes of the car wheels, the combination of longitudinal load-supporting sill-members having substantially upright portions lying between the oppositely disposed car wheels, pedestal members attached to the inner surfaces of the substantially upright portions of the sill-members, the pedestal members having apertures therein for receiving the car axles, and wheel hoods attached to the side wing-portions of the lading body and to the pedestal members.

45. In a mine or similar rail car with a lading body having a central portion and side wing-portions, car wheels extending deeply into the side wing-portions, car axles, and a bottom to the lading body having at least substantial portions located below the horizontal plane of the axes of the car wheels, the combination of longitudinal load-supporting sill-members having substantially upright portions lying between the oppositely disposed car wheels, pedestal members attached to the inner surfaces of the substantially upright portions of the sill-members, the pedestal members having apertures therein for receiving the car axles, and wheel hoods attached to the side wing-portions of the lading body and extending over the pedestal members.

46. In a mine or similar rail car with a lading body having a central portion and side wing-portions, car wheels extending deeply into the side wing-portions, car axles, and a bottom to the lading body having at least substantial portions located below the horizontal plane of the axes of the car wheels, the combination of longitudinal load-supporting sill-members having substantially upright portions lying between the oppositely disposed car wheels, pedestal members attached to the inner surfaces of the substantially upright portions of the sill-members, the pedestal members having apertures therein for receiving the car axles, wheel hoods attached to the side wing-portions of the lading body and to the pedestal members, and tie members extending between oppositely disposed pedestal members and attached to said pedestal members.

47. In a mine or similar rail car with a lading body having a central portion and side wing-portions, car wheels extending deeply into the side wing-portions, car axles, and a bottom to the lading body having at least substantial portions located below the horizontal plane of the axes of the car wheels, the combination of longitudinal load-supporting sill-members having substantially upright portions lying between the oppositely disposed car wheels, pedestal members attached to the inner surfaces of the substantially upright portions of the sill-members, the pedestal members having apertures therein for receiving the car axles, wheel hoods attached to the side wing-portions of the lading body and extending over the pedestal members, and tie members extending between oppositely disposed pedestal members and attached to said pedestal members.

48. In a four wheel mine car, the combination in a lading body, of a central portion and side wing-portions sloped to discharge into the central portion, axles for the car wheels, side sills supporting the side wing-portions, pedestal members attached to the inner surfaces of the side sills, the pedestal members having apertures therein for receiving the axles, and wheel hoods attached to the side wing-portions of the lading body and to the pedestal members.

49. In a four wheel mine car, the combination in a lading body, of a central portion and side wing-portions sloped to discharge into the central portion, axles for the car wheels, side sills supporting the side wing-portions, pedestal members attached to the inner surfaces of the side sills, the pedestal members having apertures therein for receiving the axles, and wheel hoods attached to the side wing-portions of the lading body and extending over the pedestal members.

50. In a four wheel mine car, the combination in a lading body, of a central portion and side wing-portions sloped to discharge into the central portion, axles for the car wheels, side sills supporting the side wing-portions, pedestal members attached to the inner surfaces of the side sills, the pedestal members having apertures therein for receiving the axles, wheel hoods attached to the side wing-portions of the lading body and to the pedestal members, and tie members extending between oppositely disposed pedestal members and attached to said pedestal members.

51. In a four wheel mine car, the combination in a lading body, of a central portion and side wing-portions sloped to discharge into the central portion, axles for the car wheels, side sills supporting the side wing-portions, pedestal members attached to the inner surfaces of the side sills, the pedestal members having apertures therein for receiving the axles, wheel hoods attached to the side wing-portions of the lading body and extending over the pedestal members, and tie members extending between oppositely disposed pedestal members and attached to said pedestal members.

52. In a vehicle, the combination in a lading body, of a central portion and side wing-portions sloped to discharge into the central portion, wheels extending into the side wing-portions, axles, longitudinal load supporting sill-members having substantially upright portions lying between oppositely disposed wheels, hood-structures extending over the wheels with portions extending downwardly forming inner closure walls for the hoods, and tie members extending between oppositely disposed hood-structures and attached to said hood-structures, said tie members having the major portions thereof disposed above the horizontal plane of the upper edges of the sill-members.

53. In a vehicle, the combination of a side sill having an upright portion with a notch in its upper edge to receive a hub of a wheel, whereby said upright portion is disposed relatively close to the inner face of the wheel, and a reinforcing truss member for the side sill and secured thereto, said truss member having a portion extending across the hub portion of the wheel disposed in the side sill notch.

54. In a vehicle, the combination of a side sill having upright and horizontal flanges, said upright flange having a notch formed in the upper edge thereof and of sufficient size and in position to receive a hub portion of a wheel, said upright flange being disposed relatively close to the inner face of the wheel and having the horizontal flange extending inwardly from said upright flange of the side sill, and a reinforcing member disposed above the horizontal flange of the side sill and abutting the upright flange thereof in position to reinforce said flange about the notch, said reinforcing member having an opening therethrough for receiving an axle.

55. In a vehicle, the combination in a lading body, of a central portion and side wing-portions sloped to discharge into the central portion, longitudinal load supporting sill-members for the side wing-portions, wheels extending into the side wing-portions, axles for the wheels, hood-structures connected with the side wing-portions and extending over the wheels and having inner closure walls rising above the sloping side wing-portions and exposed to the lading in the vehicle, and tie means extending between the inner closure walls of oppositely disposed hood-structures and attached to said inner closure walls above the points of juncture of said walls with the sloping side wing-portions.

56. In a mine or similar rail car, the combination in a lading body, of a central portion and side wing-portions sloped to discharge into the central portion, car wheels extending into the side wing-portions, car axles for the wheels, longitudinal load supporting sill-members lying between oppositely disposed car wheels, hood-form structures connected with the side wing-portions and having top coverings above the wheels, said hood-form structures having inner wall portions rising above the sloping side wing-portions and closing the inner ends of the top coverings from the lading space of the car, and tie means extending between oppositely disposed hood-form structures and attached directly to the inner wall portions thereof above the points of juncture of said wall portions with the sloping side wing-portions.

57. In a four wheel mine car having flanged wheels, and axles, the combination of a side sill having an upright portion with a notch in its upper edge of sufficient size to receive a portion of a hub of one of said wheels to permit said upright portion to be disposed in relatively close relation to the inner face of the wheel flange for increasing the capacity of the car, and a reinforcing truss member for the side sill and secured thereto, said truss member having a portion extending across the wheel hub disposed in the side sill notch and cooperating with said notch.

58. In a mine or similar rail car, the combination of side sills having upright outer faces with openings therein, flanged wheels, and axles for the car, the wheels having hubs projecting inwardly into said openings beyond the upright planes of the outer faces of the side sills, whereby said upright faces are disposed relatively close to the inner faces of the wheel flanges.

59. In a mine car supported on wheels, the combination of a side sill having an upright section with its lower edge below the wheel axes, said upright section having an opening therein, one of said wheels having a hub projecting into said opening beyond the upright plane of the upright section, whereby said upright section is disposed relatively close to the inner face of the wheel.

HUGH W. SANFORD.